United States Patent
Fahrbach et al.

(12) 
(10) Patent No.: US 6,366,045 B1
(45) Date of Patent: Apr. 2, 2002

(54) OPERATING-CYCLE SYNCHRONIZED ENGAGEMENT AND DISENGAGEMENT OF SERVO AXLE GROUPS BY MEANS OF ELECTRONICALLY SIMULATED CAM DISKS

(75) Inventors: Christian Fahrbach, Streamwood, IL (US); Hans-Peter Gottschalk, Willich (DE)

(73) Assignee: Mannesmann AG, Düsseldorf (DE)

( * ) Notice: Subject to any disclaimer, the term of this patent is extended or adjusted under 35 U.S.C. 154(b) by 0 days.

(21) Appl. No.: 09/617,462

(22) Filed: Jul. 17, 2000

(30) Foreign Application Priority Data

Jul. 16, 1999 (DE) .......................................... 199 34 044

(51) Int. Cl.[7] .............................................. G05B 11/01
(52) U.S. Cl. ........................ 318/560; 318/569; 318/570; 318/581; 318/600
(58) Field of Search ................................ 318/560, 569, 318/570, 581, 600; 476/36

(56) References Cited

U.S. PATENT DOCUMENTS

| | | | |
|---|---|---|---|
| 5,355,062 A | 10/1994 | Takizawa et al. ........ 318/568.1 |
| 6,039,672 A | * 3/2000 | Bursal .......................... 476/36 |
| 6,068,573 A | * 5/2000 | Folino et al. ................. 476/36 |

OTHER PUBLICATIONS

S. Berg: Königs–Wellen Transputer–SPS erzetzt Kurvenscheiben, Electronik Praxis Nr. 1–10 Jan. 1997 S.23, 24, 26, 27. No Translation.

* cited by examiner

Primary Examiner—Karen Masih
(74) Attorney, Agent, or Firm—Cohen, Pontani, Lieberman & Pavane

(57) ABSTRACT

Disclosed is a system for an operating-cycle synchronized disengagement and re-engagement of groups of servo axles to be synchronized electronically and a method for disengaging and engaging a servo axle group to be synchronized electronically with a master position value sequence where, by correlations of master position value sequences stored in a computer, and servo axle group reference values assigned to these sequences in each case, the servo axle group reference values are determined in such a way that, following engagement, synchronization of the speed and angle of the servo axle group with the master position value sequence is carried out. The synchronization of the angle of the servo axle group reference values with the master position value sequence on the basis of the tables during disengagement and subsequent engagement is carried out in such a way that operating cycles executed by the servo axle group during the processing of a product are offset in time with respect to the master position value sequence by one or more complete operating cycles of the master position value sequence or of the servo axle group.

42 Claims, 5 Drawing Sheets

Example having 4 axle groups and 10 sevo axles

Fig.1: Example having 4 axle groups and 10 sevo axles

Fig. 3: Electronically simulated curved disc profile for continuous use (1:1) and an example of two curves for stroke synchronous engaging and disengaging of a servo axle group Disengaging

| Masterposition | Position / Servo- Group |
|---|---|
| 00° | 00° |
| 30° | 30° |
| 60° | 60° |
| 90° | 80° |
| 120° | ... |
| 150° | ... |
| 180° | ... |
| 210° | ... |
| 240° | 138° |
| 270° | 155° |
| 300° | 170° |
| 330° | 177° |
| 360° | 180° |

Engaging

| Masterposition | Position / Servo- Group |
|---|---|
| 00° | 180° |
| 30° | 183° |
| 60° | 190° |
| 90° | 205° |
| 180° | ... |
| 210° | ... |
| 240° | ... |
| 270° | 280° |
| 300° | 300° |
| 330° | 330° |
| 360° | 360° |

Fig. 5

OPERATING-CYCLE SYNCHRONIZED ENGAGEMENT AND DISENGAGEMENT OF SERVO AXLE GROUPS BY MEANS OF ELECTRONICALLY SIMULATED CAM DISKS

BACKGROUND OF THE INVENTION

1. Field of the Invention

The invention relates to a method for the electronic engagement and disengagement of a group of servo axles to be synchronized electronically with a master shaft reference value and an apparatus therefor.

2. Description of the Related Art

The synchronization of servo axles by means of electronic control systems in order to replace mechanical gearboxes is known, for example, in the field of printing machines in the form of an electronic king shaft, which by means of electronic synchronization of the drive axles of a number of printing-unit towers in a printing machine, replaces the mechanical king shaft previously used. The synchronization of a servo axle to the master axle is carried out either with the master axle at a standstill, by positioning the servo axle to the synchronizing position, or dynamically, that is to say with a changing master position. In the case of dynamic synchronization, the servo axle is accelerated to the master speed and then, if necessary, a desired phase shift between the master reference value and the servo axle position is set. This procedure for dynamic synchronization or else de-synchronization is complicated and generally relatively inaccurate, as a result of which appropriate phase correction movements are then necessary. This procedure is therefore often not adequately synchronous for groups of servo axles. In particular, the disengagement and engagement, synchronized with the cycle of the master reference value (operating-cycle synchronized) of a group of servo axles to be synchronized electronically with a master axle is therefore not implemented with sufficient accuracy.

The object of the present invention is therefore to provide an apparatus for, and the implementation of a method which, in the most simple, efficient and sufficiently accurate manner possible, permits the disengagement and engagement of a group of servo axles in a manner synchronized with the operating cycle of a real or virtual master axle.

SUMMARY OF THE INVENTION

The present invention is an apparatus for, and a method of, disengaging and engaging a servo axle group to be synchronized electronically with a master position value sequence comprising entering into a computer a correlation of master position value sequences and servo axle group reference values assigned to these sequences in each case wherein the servo axle group reference values are determined in such a way that, following engagement, synchronization of the speed and angle of the servo axle group with the master position value sequence is carried out. Also, there is a carrying out of the synchronization of the angle of the servo axle group reference values with the master position value sequences during disengagement based on a disengagement correlation and subsequent engagement such that operating cycles executed by the servo axle group during the processing of a product are offset in time with respect to the master position value sequence by one or more complete operating cycles of the master position value sequence or of the servo axle group.

The invention permits the disengagement and engagement, synchronized with the operating cycle of a master reference value, of groups of electronically synchronized servo axles. For this purpose, appropriate reference value tables or correlations (electronic cam disks) are defined for the engagement, for the synchronous operation, for the disengagement and for the disengaged state. These electronic cam disks contain the desired reference value movement profile for the group of servo axles in relation with the master reference values in particular a virtual master axle reference value or a real master shaft actual value which may be measured by a transmitter. By means of the controlled change between the corresponding electronic cam-disk profiles at defined master positions, the disengagement and engagement of groups of electronically synchronized servo axles, synchronized with the operating cycle, are achieved. In this case, synchronized with the operating cycle can mean one or more complete or partial revolutions of the master axle or the servo axles, and relates to the operating cycles executed by the master axle. Operating cycles can be, in particular, processing steps in the processing (including packaging, etc.) of a product, it being necessary during the manufacture, individual packaging and group multiple packaging of the products, in the event of failure or poor manufacture of a product, to miss out or omit its subsequent individual packaging by one operating cycle and the following group packaging of a number of individual products by a fraction of an operating cycle there (for example by one quarter of an operating cycle in the case of the collective packaging of four products), in order to obtain complete collected-packaged products. In the case of a change between the different electronic cam disks, it must be ensured by suitable measures that no discontinuity occurs in the course of the reference values.

In this case, synchronization with the operating cycle refers to the entire procedure of disengagement and engagement (and, if appropriate, in between missing an operation by stopping the axle, etc. for a specific number of operating cycles or fractions of operating cycles).

The various features of novelty which characterize the invention are pointed out with particularity in the claims appended to and forming a part of this specification. For a better understanding of the invention, its operating advantages and specific objects obtained by its use, reference should be had to the accompanying drawings and descriptive matter in which there is illustrated and described a preferred embodiment of the invention.

BRIEF DESCRIPTION OF THE DRAWINGS

FIG. 5 shows a table each for the electronic simulation of a disengagement and an engagement cam disk.

DETAILED DESCRIPTION OF THE PRESENTLY PREFERRED EMBODIMENTS

Figure 1:
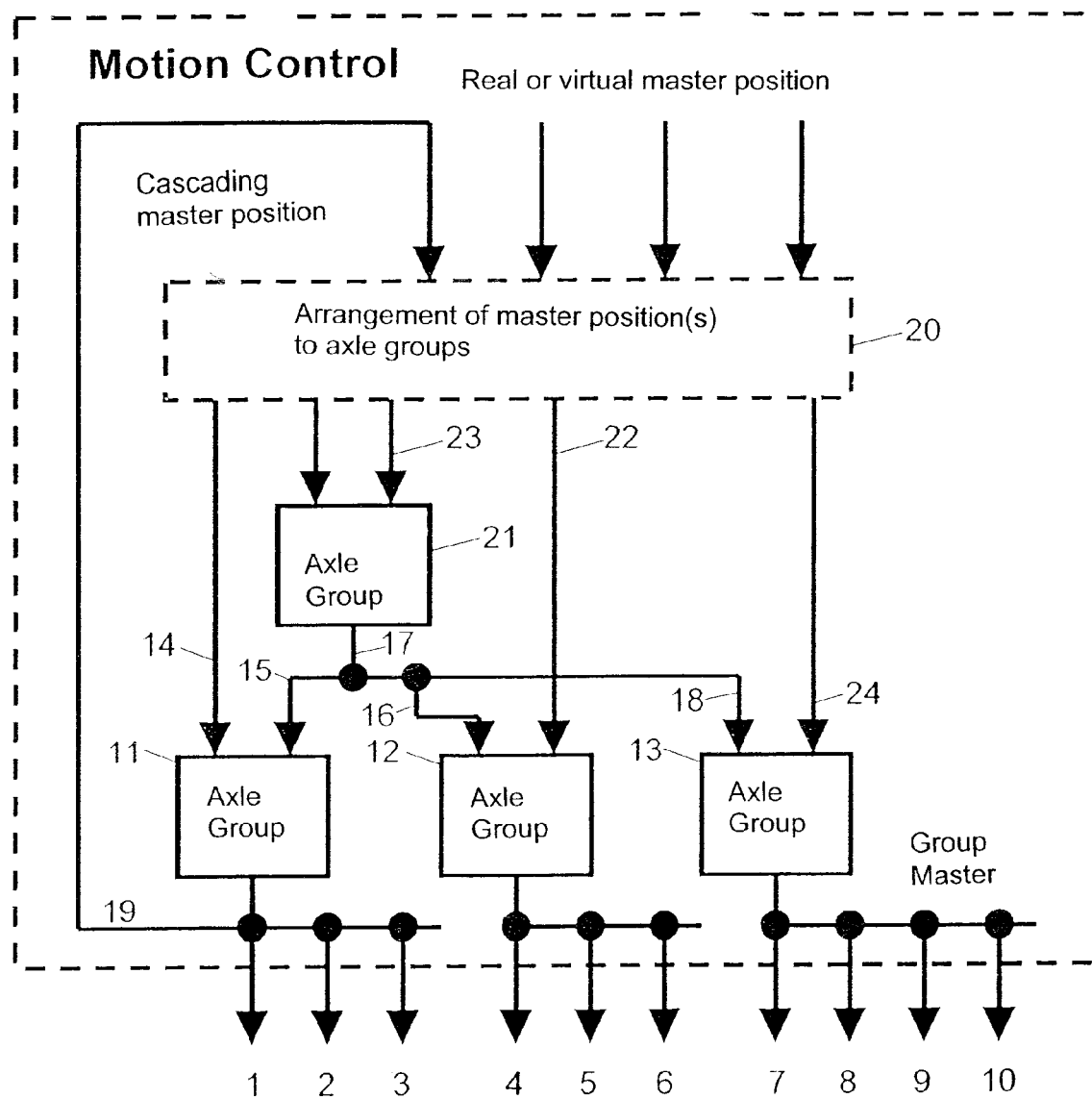
FIG. 1 shows, as a block diagram, a number of servo axle groups to be synchronized with a master axle position sequence in each case.

FIG. 1 shows, as a block diagram, elements of a device for the disengagement and re-engagement of servo axle groups according to the invention synchronously with an operating cycle. Thus, by means of the outputs 1 to 3, the servo axles of a first servo axle group (for example individual product manufacture in FIG. 4, left) are driven or supplied with reference values. Servo axles 4 to 6 drive or supply reference values to the servo axles of a second servo axle group 12 (for example individual product packaging in FIG. 4, center). Servo axles 7 to 10 supply reference values to or drive the servo axles of the servo axle groups 13 (for example collective product packaging in FIG. 4, right). The reference values can in particular contain reference positions for drives of a servo axle. Here, the reference values can comprise a rotation angle (0 to 360°). As a rule, in addition to the degree position, a number of revolutions is specified, so that there is no overrunning, and reference values requiring more than one revolution can also be output to the servo axle motors.

Figure 2:
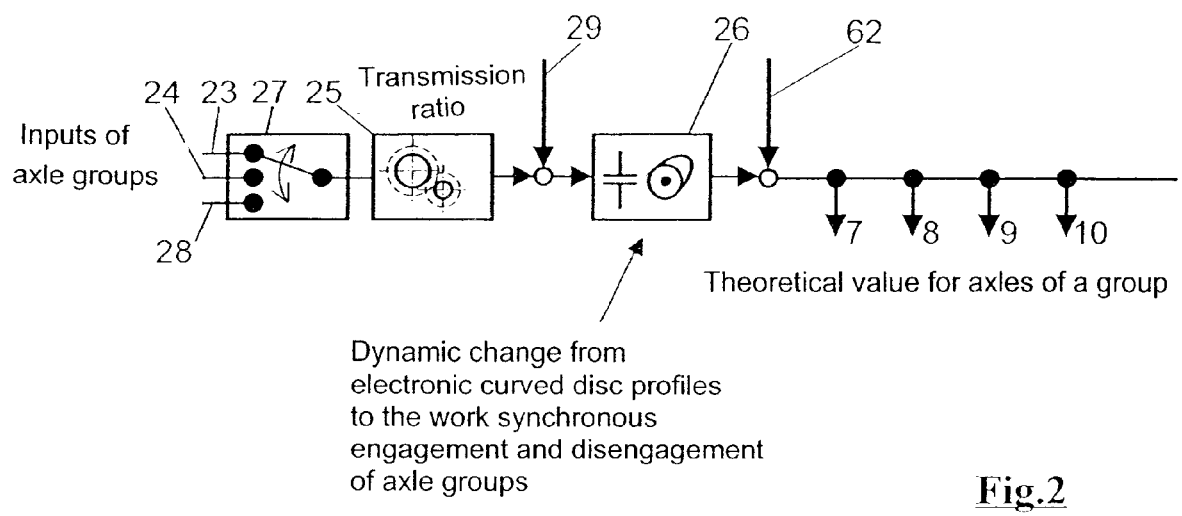
FIG. 2 shows, as a block diagram, the disengagement and re-engagement of a servo axle group, synchronized with the operating cycle of one of the master axle position inputs, with an electronically simulated transmission ratio and an electronically simulated cam disk.

The axle group control modules 11 to 13 shown in FIG. 1 each have a number (here two) of switchable inputs, into which master position values (in the sense of the invention) for these axle groups can be input and between which it is possible to switch (in accordance with FIG. 2, left).

The master positions in each case input into one input of an axle group control system 11 to 13 can be real or virtual master positions. A real master position can, for example, be a master position picked off from a master axle by a transmitter. A virtual master position, or sequence of master positions, can be a desired (virtual) master position sequence calculated by a computer or a master position sequence estimated by a computer, etc.

The master position values in each case present at the inputs of an axle group (axle group control system or axle group signal line) 11, in the form of digital signals 14, 15, can originate either from a central control unit and, via the latter, from a central presetting means, or from another axle group or from a real or virtual master position 14. The signals 15 can also originate from another axle group or from a transmitter measuring the actual position of the axle group or by the reference position of this axle group being switched through 15. The actual position measured with a transmitter or the reference position forwarded as a signal of an axle group can also be present (signal 17) as the master position at the input 15, 16, 18 of a number of axle groups 11, 12, 13. Cascading can also be carried out in such a way that the reference value 19 (generally digital) output at the output of an axle group 11 is provided to a central allocation module 20, which allocates master positions to different axle groups 11 to 13, 21 and transmits the positions to them (14 to 18, 22).

The cascading of a group servo axle reference value 19 (or, analogously, of an actual value of a servo axle) as a master position value used can be carried out via an allocation unit 20 or directly into another axle group.

A master axle value sequence is generally a master axle position sequence, for example a sequence of angular positions. It is generally transmitted digitally.

FIG. 2 shows, as a block diagram, the selection of one of the inputs (here three) 23, 24, 28 of an axle group for example 13 in FIG. 1, the electronic simulation of a gearbox transmission ratio, which defines the ratio between the group axle revolutions and a master revolution 25, a disengagement and engagement unit 26, which disengages and re-engages the axles of a group synchronously with an operating cycle (shifted by one or more complete operating cycles or fractions of operating cycles) in a manner synchronized with a master position sequence (= with a master axle).

The switch 27 which, for example, can be controlled electronically by a central control system, selects a master position value 23, 24, 38 at the input of an axle group 13.

Additional, additive reference values can be predefined via the inputs 29 and 62.

By means of the disengagement and engagement unit 26 which essentially controls one "axle group" according to FIG. 1, the disengagement and re-engagement of the servo axles 7 to 10 of a servo axle group is controlled synchronously with an operating cycle.

A group of servo axles generally includes a number of servo axles. Under certain circumstances, however, it can also be composed of only one servo axle.

Operating-cycle synchronized disengagement and re-engagement can be used in particular if a group of servo axles (or, analogously, one servo axle) is to be stopped or delayed briefly in order, for example, to miss out or bypass one operating cycle, a number of operating cycles, a fraction of an operating cycle, a quarter, a half or one and a half operating cycles. The need to miss out an operation, and therefore to disengage and re-engage synchronously with an operating cycle, will be explained further below in detail using an exemplary embodiment illustrated in FIG. 4. It results in particular when, during the processing of a product, a number of successive operating steps, chronologically comprising one operating cycle there in each case, is executed, and one of the steps has been executed with a delay or incorrectly, with the product of the operation being removed by selection, so that subsequent operating steps must be delayed by operating cycles or fractions of operating cycles.

Figure 3:
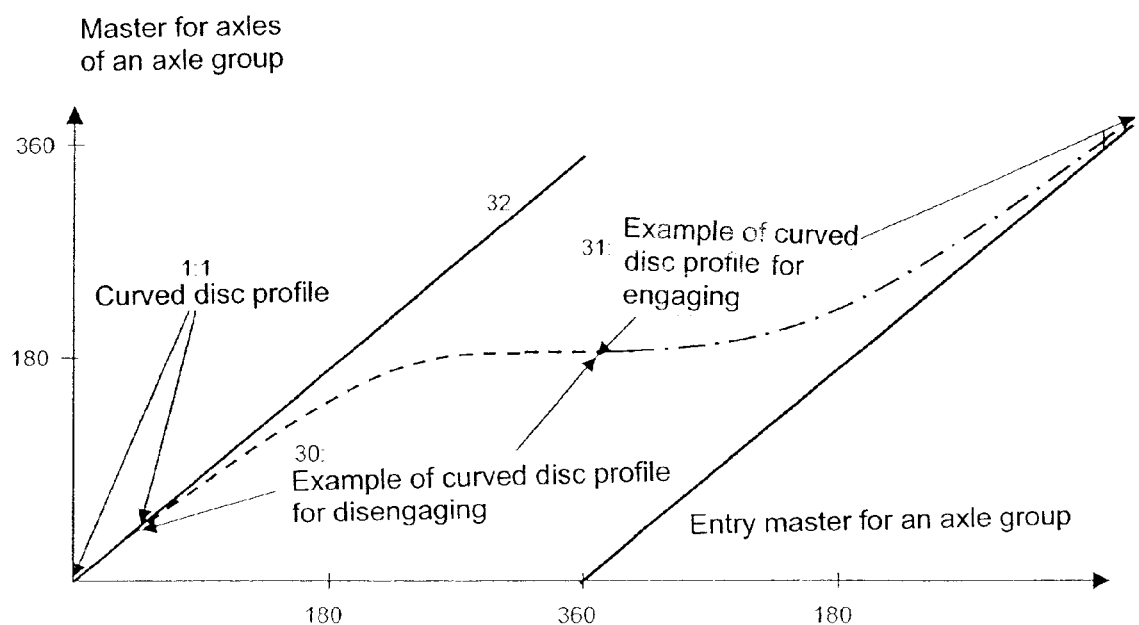
FIG. 3 shows an example of electronically simulated cam-disk profiles in the case of the disengagement and engagement of an axle group synchronously with an operating cycle.

FIG. 3 illustrates, using an example, how disengagement and engagement is carried out synchronously with an operating cycle, as referred to a master position value present at the input of an axle group (here, master position value always means a sequence of master position values). In the example illustrated, an operating cycle of the master shaft is 360° of rotation long, and an operating cycle of a servo axle group (Y-axis) is 360° of its servo drive.

In FIG. 3, a servo axle group is disengaged (dashed curve) between the arrows relating to reference symbol 30) and re-engaged between the arrows relating to reference symbol 31, the disengagement and engagement here lasting for a total of one operating cycle (360°) of the master axle. Between the engagement and disengagement, the servo axle group can also remain for a time in the disengaged state, which would correspond to a horizontal portion of the curve in the example, since the servo axle motor does not continue to rotate during the disengaged state. In the engaged state (diagonal portion in Example 32 in FIG. 3), the rotational speed of the servo axle group is essentially determined by the transmission ratio (FIG. 2, ref. numeral 25).

The disengagement (in the area 30 in FIG. 3) can be carried out on the basis of a disengagement table or correlation (in 26). The engagement 31 can be carried out on the basis of an engagement table or correlation (in 26). A table or correlation can likewise be provided for an engaged area 32 and/or a disengaged area (horizontal in FIG. 3). In the engaged state, the values can simply be passed through as well in the disengagement and engagement unit 26 in FIG. 2, and in the disengaged state, the values present at 26 can simply be blocked.

One disengagement table can contain axle group reference values assigned to a series of master positions (reference angular preset values for a servo motor, etc.). An example of disengagement and engagement tables or correlations is shown by FIG. 5. During disengagement, the servo motor (given a transmission ratio 25 of 1:1) initially (0° to 30°) moves as fast as the master, but delayed with respect to the latter, and from a master position of 180° is at a constant angular position, therefore stationary and therefore disengaged. During engagement with an engagement table according to FIG. 5, this is carried out correspondingly in the opposite direction. The table values can also be used as additive or subtractive values relating to measured master and/or servo positions at the current time.

Figure 4:
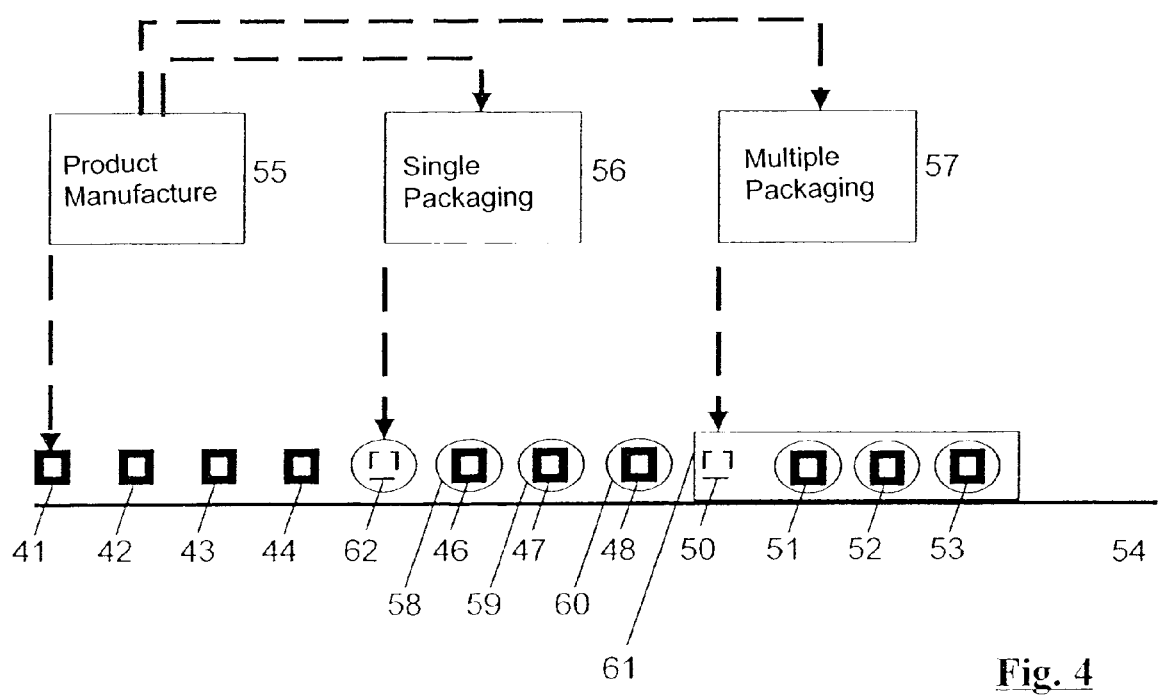
FIG. 4 shows an example of the disengagement and re-engagement of servo axle groups synchronously with an operating cycle.

FIG. 4 shows an example of one application of the invention.

In FIG. 4, essentially three operating steps are carried out on a production line 54 with regard to products 41 to 53, specifically the manufacture 55 of the products, the individual packaging 56 of the products and the collective packaging 57 of a number of products together in each case.

In the example illustrated, the products are pieces of chocolate 41 to 53, which are manufactured in step 55, wrapped with an individual wrapper 58, 59, 60 in step 56, and in each case wrapped with a collective package in groups (50 to 53) in step 61.

The manufacture 55 of the products produces the products 41 to 53 in one operating cycle (predefined for them) and places these one after another onto the production line 54. The individual packaging device 56 packages the individual products in its own operating cycle, which here is as long as the operating cycle of the product manufacture. This collective packaging device 57 packs four products in each case in a collective package in its own operating cycle, whose length is four times the operating cycle of the product manufacture. The operating steps are in each case driven by groups of servo axles. There is therefore one group of servo axles for 55, one for 56 and one for 57.

If, in the example illustrated, a manufactured chocolate 62 is too small and is removed by sorting, it is necessary to avoid the individual packaging producing an empty package. For this reason, the individual packaging misses out one operating cycle. For this purpose, as described above, the servo axles of the servo axle group of the individual packaging 56 misses out one operating cycle of the product manufacture by means of disengagement and engagement (= braking and acceleration). The reference values for product manufacture 55 are, in this example (with a transmission ratio of 1:1), master values for the individual packaging 56 (as, for example, the axle group 21 in FIG. 1 is a master value for axle group 11). By missing out the individual packaging by one operating cycle of the product manufacture, the production of an individually packaged chocolate-less element 62 is avoided.

In the collective packaging device 57, the intention is to avoid a collective package 61 being produced from which one piece of chocolate 50 or 62 is missing. Therefore, in the above case, the collective packaging misses out one quarter of its operating cycle. Depending on the implementation, this can be carried out differently: if, for example, the collective packaging is controlled with a transmission ratio (of 1:4) from the master cycle of the product manufacture 55, a packaging cycle relating to the collective package 61 from the collective packaging 57 comprises the unit of time which the product manufacture needs for four products. Therefore, the collective package has to miss out one quarter of its operating cycles. This is likewise carried out, synchronously with an operating cycle, by means of the disengagement and re-engagement described above.

The terms and expressions which have been employed are used as terms of description and not of limitation, and there is no intention in the use of such terms and expressions of excluding any equivalent of the features shown and described or portions thereof, it being ii recognized that various modifications are possible within the scope of the invention.

We claim:

1. A method of disengaging and engaging a servo axle group to be synchronized electronically with a master position value sequence comprising:

entering into a computer a correlation of master position value sequences and servo axle group reference values assigned to said sequences in each case, wherein the servo axle group reference values are determined in such a way that, following engagement, synchronization of the speed and angle of the servo axle group with the master position value sequence is carried out; and carrying out the synchronization of the angle of the servo axle group reference values with the master position value sequence during disengagement based on a disengagement correlation and subsequent engagement such that an operating cycle executed by the servo axle group during the processing of a product are offset in time with respect to the master position value sequence by one or more complete operating cycles of the master position value sequence.

2. The method of claim 1, wherein an electronic cam profile is simulated by the correlation.

3. The method of claim 1, wherein the correlation or cam profiles represent speed ratios relating to a sequence of times between the master position and the servo axle group.

4. The method of claim 1, wherein, in relation to a master position value in the form of a reference angular position or actual angular position, a reference angular position of the servo axle group, defined relative thereto, is transmitted to a drive of the servo axle group as a reference angular position.

5. The method of claim 1, wherein there is a sequence of process stages for processing a product and one or more operating cycles during an operating step when processing the product is avoided by disengaging the servo axle group assigned to this processing step based on a disengagement correlation.

6. The method of claim 5 wherein the servo axle group assigned to the processing step is re-engaged based on an engagement correlation.

7. The method of claim 6 wherein one or more operating cycles of the master axle defining the master position elapse before the end of the re-engagement process.

8. The method of claim 1 wherein the engagement correlation, in particular one simulating an engagement cam disk, for an engagement process of a servo axle group enables the servo axle group to be accelerated from at least one of (a) a standstill to a 1:1 ratio with the master axle value sequence and (b) a 1:1 ratio with a master axle value sequence derived from the master axle by a ratio unit.

9. The method of claim 1, wherein a disengagement correlation, in particular one disengagement table simulating an electronic disengagement cam disk, brakes a servo axle group from a 1:1 ratio with the master axle value sequence or a value sequence derived from the master axle value sequence by a ratio unit at most until standstill of the servo axle group.

10. The method of claim 1, wherein a correlation is provided, in particular one simulating an electronic cam disk, for at least one of (a) a 1:1 ratio of the servo axle group with the master axle value sequence and (b) with a value sequence derived from this by a ratio unit.

11. The method of claim 1, wherein the master position value sequence is used, via a transmission ratio unit, as input for a disengagement and engagement unit of a servo axle group, in order, in the engaged state of the servo axle group, to define a transmission ratio, defined by the transmission ratio unit, between the master axle and the servo axle group.

12. The method of claim 1, wherein a cascading of a number of disengagement and engagement units is carried out by the output of one disengagement and engagement unit being connected to at least one input of another disengagement and engagement unit for another servo axle group.

13. The method of claim 9 wherein the disengagement correlation brakes a servo axle group from a 1:1 ratio with the master axle value sequence or a value sequence derived from the master axle value sequence by a ratio unit at most until standstill of the servo axle group.

14. A system for disengaging and engaging a servo axle group to be synchronized electronically with a master position value sequence comprising:
  a plurality of axle group control modules, each module having a number of switchable inputs;
  means for providing an input to said axle group control module for a master axle value sequence which represents actual values from a master axis;
  at least one disengagement and engagement unit, which has engagement and disengagement correlations stored in a memory, of master position values present at the input and servo axle group reference values assigned to these in each case, and which is designed in such a way that using these correlations, disengagement and re-engagement of a servo axle group are carried out in such a way that, following engagement, there is synchronization of angle and/or position of the servo axle group with the master position value sequence and that, following the completion of the re-engagement, operating cycles executed by the servo axle group during the processing of a product are shifted with respect to operating cycles of a master axle that outputs the master position value sequence by one or more complete operating cycles of the master axle; and
  an output unit for transmitting servo axle group reference values, determined on the basis of the correlations to he servo axle group.

15. The system of claim 14 wherein the means is a transmitter.

16. The system of claim 14 wherein the axle value sequence is predefined by a computer.

17. The system of claim 14 further comprising a transmission ratio unit.

18. The system of claim 17, wherein reference values from an output unit of a second disengagement and engagement unit of another axle group are present at the input of the first disengagement and engagement unit, by means of the transmission ratio unit.

19. The system of claim 14, wherein in each case a cam disk is simulated electronically by means of a table.

20. The system of claim 19, wherein a table is provided for an electronic cam disk for engagement and a table is provided for an electronic cam disk for disengagement.

21. The system of claim 20 wherein a 1:1 table is additionally provided for an engaging state.

22. A method of disengaging and engaging a servo axle group to be synchronized electronically with a master position value sequence comprising:
  entering into a computer a correlation of master position value sequences and servo axle group reference values assigned to said sequences in each case, wherein the servo axle group reference values are determined in such a way that, following engagement, synchronization of the speed and angle of the servo axle group with the master position value sequence is carried out; and
  carrying out the synchronization of the angle of the servo axle group reference values with the master position value sequence during disengagement based on a disengagement correlation and subsequent engagement such that an operating cycle executed by the servo axle group during the processing of a product are offset in time with respect to the master position value sequence by one or more complete operating cycles of the servo axle group.

23. The method of claim 22, wherein an electronic cam profile is simulated by the correlation.

24. The method of claim 22, wherein the correlation or cam profiles represent speed ratios relating to a sequence of times between the master position and the servo axle group.

25. The method of claim 22, wherein, in relation to a master position value in the form of a reference angular position or actual angular position, a reference angular position of the servo axle group, defined relative thereto, is transmitted to a drive of the servo axle group as a reference angular position.

26. The method of claim 22, wherein there is a sequence of process stages for processing a product and one or more operating cycles during an operating step when processing the product is avoided by disengaging the servo axle group assigned to this processing step based on a disengagement correlation.

27. The method of claim 26 wherein the servo axle group assigned to the processing step is re-engaged based on an engagement correlation.

28. The method of claim 27 wherein one or more operating cycles of the servo axle group elapse before the end of the re-engagement process.

29. The method of claim 22 wherein the engagement correlation, in particular one simulating an engagement cam disk, for an engagement process of a servo axle group enables the servo axle group to be accelerated from a at least one of (a) standstill to a 1:1 ratio with the master axle value sequence and (b) a 1:1 ratio with a master axle value sequence derived from the master axle by a ratio unit.

30. The method of claim 22, wherein a disengagement correlation, in particular one disengagement table simulating an electronic disengagement cam disk, brakes a servo axle group from a 1:1 ratio with the master axle value sequence or a value sequence derived from the master axle value sequence by a ratio unit at most until standstill of the servo axle group.

31. The method of claim 22, wherein a correlation is provided, in particular one simulating an electronic cam disk, for at least one of (a) a 1:1 ratio of the servo axle group with the master axle value sequence and (b) with a value sequence derived from this by a ratio unit.

32. The method of claim 22, wherein the master position value sequence is used, via a transmission ratio unit, as input for a disengagement and engagement unit of a servo axle group, in order, in the engaged state of the servo axle group, to define a transmission ratio, defined by the transmission ratio unit, between the master axle and the servo axle group.

33. The method of claim 22, wherein a cascading of a number of disengagement and engagement units is carried out by the output of one disengagement and engagement unit being connected to at least one input of another disengagement and engagement unit for another servo axle group.

34. A system for disengaging and engaging a servo axle group to be synchronized electronically with a master position value sequence comprising:

a plurality of axle group control modules, each module having a number of switchable inputs;

means for providing an input to said axle group control module for a master axle value sequence which represents actual values from a master axis;

at least one disengagement and engagement unit, which has engagement and disengagement correlations stored in a memory, of master position values present at the input and servo axle group reference values assigned to these in each case, and which is designed in such a way that using these correlations, disengagement and re-engagement of a servo axle group are carried out in such a way that, following engagement, there is synchronization of angle and/or position of the servo axle group with the master position value sequence and that, following the completion of the re-engagement, operating cycles executed by the servo axle group during the processing of a product are shifted with respect to operating cycles of a master axle that outputs the master position value sequence by one or more complete operating cycles of the servo axle group; and an output unit for transmitting servo axle group reference values, determined on the basis of the correlations to the servo axle group.

35. The system of claim 34 wherein the means is a transmitter.

36. The system of claim 34 wherein the axle value sequence is predefined by a computer.

37. The system of claim 34 further comprising a transmission ratio unit.

38. The system of claim 37, wherein reference values from an output unit of a second disengagement and engagement unit of another axle group are present at the input of the first disengagement and engagement unit, by means of the transmission ratio unit.

39. The system of claim 34, wherein in each case a cam disk is simulated electronically by means of a table.

40. The system of claim 39, wherein a table is provided for an electronic cam disk for engagement and a table is provided for an electronic cam disk for disengagement.

41. The system of claim 40, wherein a 1:1 table is additionally provided for an engaged state.

42. The method of claim 30 wherein the disengagement correlation brakes a servo axle group from a 1:1 ratio with the master axle value sequence or a value sequence derived from the master axle value sequence by a ratio unit at most until standstill of the servo axle group.

* * * * *